United States Patent [19]
Börner

[11] 4,441,254
[45] Apr. 10, 1984

[54] KITCHEN UTENSIL FOR CUTTING FRUIT, VEGETABLES AND THE LIKE INTO STRIPS AND A BLADE THEREFOR

[76] Inventor: Alfred Börner, Industriegebiet, 5561 Landscheid-Niederkail, Fed. Rep. of Germany

[21] Appl. No.: 271,009

[22] Filed: Jun. 5, 1981

[30] Foreign Application Priority Data

Jun. 12, 1980 [DE] Fed. Rep. of Germany ....... 3022021

[51] Int. Cl.³ .............................................. B26B 3/04
[52] U.S. Cl. .................................. 30/124; 30/279 R; 30/304; 83/858
[58] Field of Search ................................. 83/856–858; 30/278, 279 R, 304, 124

[56] References Cited

U.S. PATENT DOCUMENTS

| | | | |
|---|---|---|---|
| 557,914 | 4/1896 | Struble et al. | 83/858 X |
| 3,703,918 | 11/1972 | Börner | 83/858 X |
| 4,120,089 | 10/1978 | Börner | 30/304 X |
| 4,212,431 | 7/1980 | Doyel | 83/858 X |

FOREIGN PATENT DOCUMENTS

| | | |
|---|---|---|
| 1919675 | 11/1970 | Fed. Rep. of Germany . |
| 334725 | 9/1930 | United Kingdom . |
| 703106 | 1/1954 | United Kingdom . |
| 1299001 | 12/1972 | United Kingdom . |

*Primary Examiner*—Frederick R. Schmidt
*Assistant Examiner*—Debra S. Meislin
*Attorney, Agent, or Firm*—Shapiro and Shapiro

[57] ABSTRACT

A kitchen utensil for cutting foodstuffs such as vegetables or fruit into strips and particularly to a blade member therefor, the blade member comprising a strip of material such as metal which is integral with a plurality of spaced substantially vertical cutting blades which project from the plane of the strip, the strip being embedded in a guide plate, over which the foodstuff is moved during cutting, so that the blade member is securely held, the vertical blades projecting above the guide plate. The strip has cuts in one longitudinal edge and the metal between the cuts is bent up to form the vertical blades.

7 Claims, 4 Drawing Figures

KITCHEN UTENSIL FOR CUTTING FRUIT, VEGETABLES AND THE LIKE INTO STRIPS AND A BLADE THEREFOR

TECHNICAL FIELD OF THE INVENTION

The invention relates to a kitchen utensil for cutting fruit, vegetables or the like into strips and to a blade therefor.

BACKGROUND ART

Such a utensil often has a lower guide plate and an upper guide plate adjoining the same, the upper guide plate having on its front edge a horizontal blade and so extending obliquely in the direction of cutting, and a plurality of vertical blades being disposed on the lower guide plate in front of the horizontal blade.

Depending on the distance from the upper guide plate or horizontal blade to the lower guide plate and on the spacing of the vertical blades, such kitchen utensils can be used to cut strips of various thicknesses and usually of square cross-section, ranging from thick strips, for example, for chipped potatoes or french fries, down to shreds, for example, for raw vegetable dishes, soup garnishes or the like.

There are various proposed kinds of such kitchen utensil. One form, in particular, derives from the Applicant. It is characterised by a horizontal blade of V-shape and a removable lower guide plate as shown in West German No. 19 19 675 A, published Nov. 5, 1970. A modified version of this apparatus is provided in addition with special inserts. These can be combined with the lower guide plate and permit finer cutting, in other words the cutting of thinner strips. In all versions the vertical blades have cutting edges which extend to the level of the horizontal blade.

A disadvantage is that the vertical blades, being offset laterally with respect to the transverse direction of the utensil, are made and attached to the lower guide plate individually. In the Applicant's previously proposed kitchen utensils, the vertical blades are individual lengths cut from a continuous sheet metal strip. Each length is bent to form a foot, and each blade is then placed individually in an injection moulding die and set in synthetic plastics material. This, of course, is a time consuming and expensive operation.

Moreover, manipulation of the individual blades demands a certain thickness of material, in order to prevent excessive deformation. Usually, therefore, the sheet metal strips used are a few tenths of a millimeter thick, typically three tenths of a millimeter. This in turn makes it necessary to sharpen the metal strip, in order to ensure that the cutting edge is sharp enough. Manipulation of a number of such blades also involves a considerable risk of injury.

Since the sheet metal strip can be ground only along its long side in practice, the cutting edges on the resulting vertical blades are only on the steep front sides. The tops, by contrast, remain blunt. They exhibit the shape imparted to them when the metal strip was cut up.

Lastly, the thicknesses of material impede the cutting action. While the cutting edges can facilitate penetration of a fruit by the vertical blades, the vertically cut flesh of the fruit must then pass through the available gaps between the vertical blades. The unobstructed dimensions of each of these gaps are reduced by one thickness of material. This involves the displacement of a considerable quantity of material, the quantity increasing with the number of vertical blades provided over the width of the utensil. A utensil with 23 vertical blades each of three tenths of a millimeter thickness, for example, will have the unobstructed passage reduced by 6.9 millimeters, which of course interferes appreciably with cutting.

To summarise, therefore, proposed utensils with vertical blades are complicated to produce and do not provide convenience of cutting. Since such kitchen utensils have been used for a long time and millions are produced, this problem is of great importance.

SUMMARY OF THE INVENTION

It is an object of the invention to seek to mitigate these disadvantages of the prior art.

According to one aspect of the invention there is provided a blade member for a utensil for cutting foodstuffs, comprising:

(a) a strip of material, said strip of material having one longitudinal edge;

(b) a plurality of spaced cutting blades, said cutting blades being spaced along said one longitudinal edge of said strip of material; and (c) said cutting blades lying substantially parallel to one another and each of which blades projects from the plane of said strip of material in a direction such that the plane of the blade lies generally transverse to the longitudinal axis of said strip of material.

According to second aspect of the invention there is provided a kitchen utensil for cutting fruit, vegetables or the like, comprising a lower guide plate and an upper guide plate spaced upwardly therefrom, the upper guide plate having on its front edge a horizontal blade which extends obliquely in the direction of cutting, and a plurality of substantially vertical blades carried by the lower guide plate upstream of the horizontal blade, the plurality of vertical blades being formed from a blade member as herein defined.

A technological advantage achieved using the invention is that the blades can be produced by a simple punching, cutting and bending process. Given suitable spacing of blade forming slits and an adequate depth thereof, the intermediate parts of the strip of metal can be bent up to form effective vertical blades, (as considered in use), in order to cut strips of the desired cross-section.

Also, instead of a plurality of separate vertical blades, only one continuous blade member need be produced and manipulated. In other words, instead of cutting numerous lengths from a sheet metal strip, picking them up individually, bending them and then using them, as many vertical blades as desired can be obtained simultaneously. Manufacture and assembly are therefore simpler and safer using the invention. If the horizontal blade is not oblique in one direction only, a plurality of such blade members may be used, for example, two such blade members if the horizontal blade is V-shaped.

The fixed arrangement of the various vertical blades within such a blade member, together with the greater ease of manipulation, make it possible to use very thin metal strips or blanks from which to form the blades. These need only be, for example, one tenth of a millimeter thick, that is, for example, only one third the thickness of the metal strips used hitherto in the proposed utensils. Consequently, the amount by which the unobstructed passage is impeded is only one third of the amount lost with known vertical blades.

The cutting of cuttable foodstuffs such as fruit is therefore easier. In the case of many foodstuffs, particularly fruits, however, there is a further advantage. The reduced displacement of the cut flesh of the fruit makes cutting not only easy, but dry, that is, very little juice escapes, which is particularly advantageous for onions and the like.

The vertical (as considered in use) blades bent from the material of the strip may increase in height in the direction of cutting. When the vertical blades are so formed, in use they cut into the foodstuff such as fruit only gradually and hence very easily, becoming progressively embedded in the foodstuff, so that they are guided progressively more firmly in the foodstuff and so become stabilised. The vertical blades therefore have the same dimensional stability as the known vertical blades, but a much lower thickness of material for the strip can be used because of the way in which the foodstuff itself supports the blades during cutting. A thinner material is cheaper, so making the whole utensil cheaper.

With a slight modification, it is possible to dice readily and cleanly foodstuffs which tend to disintegrate, such as layered fruits like onions, an operation which was commonly a problem hitherto. For this purpose, the vertical blades, which usually project only slightly above the horizontal blades, must be twice as high. In other words, the height of the vertical blades should be twice the distance between the lower guide plate and the horizontal blade. Between the cutting processes the foodstuff must be turned through approximately 90° in order to effect dicing.

Dicing can also be performed with vertical blades which extend only as far as the horizontal blade. In this case the foodstuff must first be cut manually with a number of parallel knife cuts. The foodstuff is then placed with these cuts arranged across the direction of cutting and is run repeatedly against the horizontal blade without being turned.

Blades embodying the invention result in a considerable increase in safety, because the vertical blades can be incorporated in the utensil in a permanent fashion. In proposed kitchen utensils, on the other hand, there is a risk that one or more of the vertical blades might on occasion find its way into the cut food, for example, in the event of incorrect operation or if the utensil is broken.

The dimensional stability of the blades is particularly high if the slits are of equal depth and each extends only as far as an upwardly bent part.

A slight drawing action can be imparted to cutting if, for example, the slits are made in the front (as considered in use) long side of the strip or blade member.

If the vertical blades are to end promptly after their maximum height is reached, for example so that they can be particularly close to the horizontal blade, the slits may be at somewhat less than a right angle to the direction of cutting, that is to the longitudinal axis of the strip or blade member.

Given the thinness of the material used, the sheet metal strips act like razor blades. Their long sides are so thin that sharpening is not essential. However, the cutting action can be enhanced by providing a sharpened outer edge on the long side with the slits. Sharpening can be performed on the metal strip before it is shaped that is before the blades are bent out of the strip. The upper cutting edge of the parts subsequently bent upwards will be particularly effective.

In use, the metal strip could be secured to the surface of the lower guide plate of the utensil, for example with adhesive or rivets. Preferably, however, the strip of metal is engaged positively in the lower guide plate. In household utensils made from synthetic plastics material this means that the strip of metal with the bent-up blades is placed in the injection moulding die and cast integrally, the upwardly bent parts then passing through or projecting from the guide plate.

A kitchen utensil embodying the invention is hereinafter described, by way of example, with reference to the accompanying drawings.

BRIEF DESCRIPTION OF THE DRAWINGS

Referring to the drawings, FIG. 1 shows a kitchen utensil for cutting fruits into strips, the direction of cutting being represented by an arrow 1. The utensil has a lower (as considered in use) guide plate 2 and an upper (also as considered in use) guide plate 3 adjacent it in the direction of cutting. The planes of the guide plates 2 and 3 are substantially parallel to each other so that a gap is formed through which cut foodstuff can pass. Edge or frame members 4 project laterally over and define the upper guide plate 3. The members 4 also retain the lower guide plate 2, which is a removable slide-in part.

Figure 1:
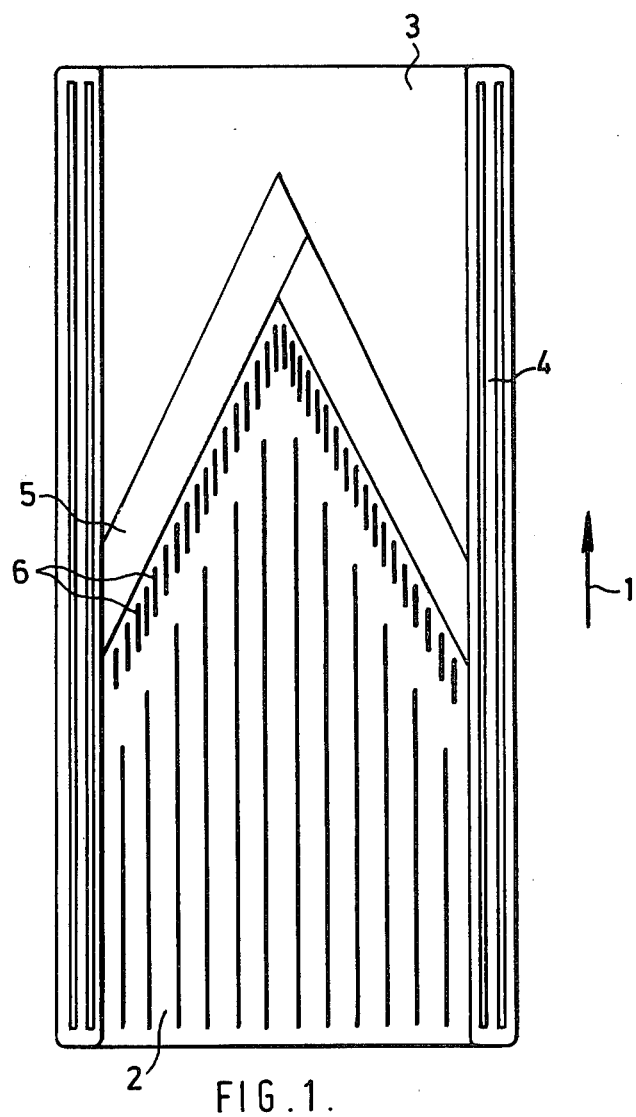
FIG. 1 is a plan view of a complete kitchen utensil embodying the invention.

On its front (as considered in the direction of cutting 1) edge the upper guide plate 3 bears a horizontal (as considered in use) blade 5 which extends diagonally in the direction of cutting, starting from each member 4. Overall, therefore, the horizontal blade 5 is V-shaped, i.e. convergent in the direction of cutting. In front of and spaced from the horizontal blade 5 there is a plurality of vertical (in use) blades 6 carried by the lower guide plate 2.

Figures 2, 3:
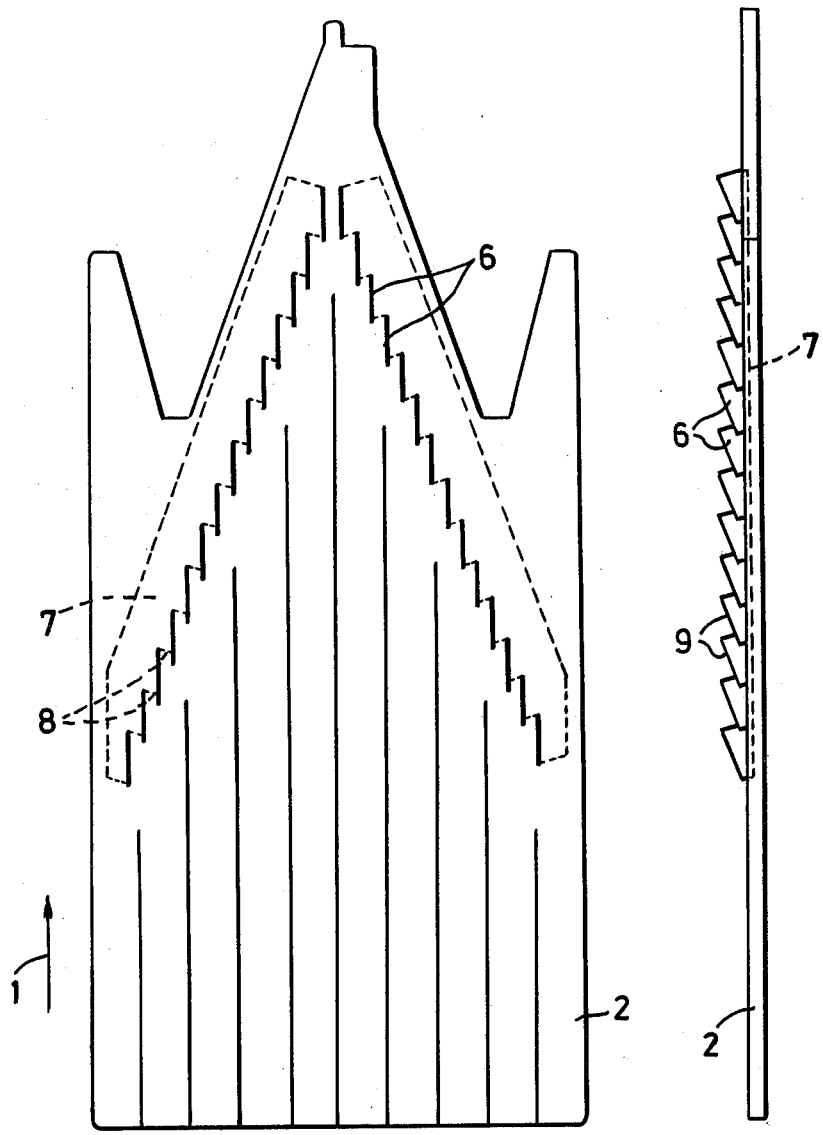
FIG. 2 is a plan view of a lower guide plate, to a larger scale, of the utensil.
FIG. 3 is a side elevational view of the plate of FIG. 2.
Figure 4:
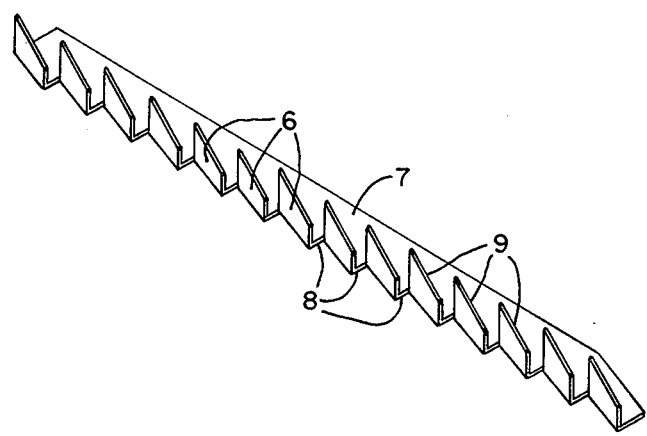
FIG. 4 is a perspective view of a blade member employed in the invention.

As shown particularly in FIGS. 2, 3, and 4 the vertical blades 6 are made from a continuous strip 7 of metal. The strip 7 is thin, being only about one tenth of a millimeter in thickness. The strip 7, or blade member, is generally rectangular and consists of a flat base portion and a plurality of upwardly bent portions. By means of its flat base portion the strip 7 is embedded in the material of the lower guide plate 2 whereas its upwardly bent portions pass through the material of the lower guide plate 2 and project upwardly. The upwardly bent portions constitute the vertical blades 6.

To produce these blades 6 the strip 7 of metal is provided on its front, or upstream, (as considered in the direction of cutting 1)long side with equispaced parallel slits 8 of equal depth (length), running transversely to the length of the strip 7, which is transversely to the direction of cutting and each extending (in the embodiment illustrated) only as far as an upwardly bent portion.

When seen from the side, the upwardly bent portions point upwardly (FIG. 3) in the direction of cutting. Their height increases in the direction of cutting from nearly zero (FIG. 3) and extends at least to the level of the horizontal blade 5. The front long side of the strip 7 also bears a sharpened outer (to the left when consider the left hand strip 7 in FIG. 3) edge 9, which provides a particularly effective upper edge on the vertical blades 6. As shown in FIGS. 2 and 3, the blades 6 lie at right angles to the plane of strip 7 and transversely to the longitudinal axis of the strip, each blade being formed by turning up metal along the sharpened edge 9 between adjacent slits 8 along a line which intersects one slit intermediate the length thereof and the other slit at the end remote from the sharpened edge 9. Thus each blade has its greatest height nearer to one end of the blade than to the other.

It will also be understood that, as shown in the drawings, two strips or blade members 7 are used which are convergent in the direction of cutting or as considered in the longitudinal direction of the utensil or lower guide plate 2 so as to provide blades 6 which are in a 'V' -formation and which are also staggered as considered transversely of the utensil.

It will be also understood that in the embodiment of the invention shown in the drawings and above described, the vertical (in use) blades are formed from a continuous strip of metal, the strip of metal containing on one long side parallel, equispaced slits running transversely relative to the direction of cutting, and those parts of it situated between the slits being bent upwards so that each of them points in the direction of cutting (as seen in plan view).

Also, the invention above described and shown in the drawings may be modified. Thus, the spacing between the blades may not be uniform. Also, the strip or blade member may be of any suitable material other than metal, for example plastics material may be used, in which case the blades 6 and strip may be integrally formed in a single moulding operation.

I claim:

1. A blade member for a utensil for cutting foodstuffs, comprising:
   (a) a generally rectangular strip of metal which is sharpened along one longitudinally extending edge and which has a portion adapted to form a base for a plurality of cutting blades;
   (b) a plurality of parallel slits which extend from said sharpened edge transversely to the length of said strip; and
   (c) a plurality of spaced cutting blades lying at right angles to the plane of said base portion of the strip of metal and transversely to the length of the strip, each blade of said plurality of cutting blades being constituted by a portion of said generally rectangular strip of metal located adjacent to the sharpened edge of the strip and between adjacent slits, the metal of each blade merging with said base portion of the strip along a line which intersects one of the adjacent slits intermediate the length thereof and the other of said adjacent slits at an end thereof remote from said sharpened edge, each blade having its greatest height nearer to one end of the blade than to the other.

2. A blade member according to claim 1, wherein the blades are equidistantly spaced over the one longitudinal edge.

3. A kitchen utensil for cutting fruit, vegetables or the like comprising:
   (a) a lower guide plate;
   (b) an upper guide plate spaced vertically from the lower guide plate;
   (c) a horizontal blade, said horizontal blade being carried by a front edge of the upper guide plate and extending obliquely with reference to the direction of cutting;
   (d) a blade member carried by the lower guide plate upstream of the horizontal blade;
   (e) said blade member comprising a generally rectangular strip of metal which is sharpened along one longitudinally extending edge and which has a portion adapted to form a base for a plurality of cutting blades;
   (f) a plurality of parallel slits which extend from said sharpened edge transversely to the length of the strip; and
   (g) a plurality of spaced cutting blades lying at right angles to the plane of said base portion of the strip of metal and transversely to the length of the strip, each blade of said plurality of cutting blades being constituted by a portion of said generally rectangular strip of metal located adjacent to the sharpened edge of the strip and between adjacent slits, the metal of each blade merging with said base portion of the strip along a line which intersects one of the adjacent slits intermediate the length thereof and the other of said adjacent slits at an end thereof remote from said sharpened edge, each blade having its greatest height nearer to one end of the blade than to the other, said one end of each blade being the end nearest said horizontal blade.

4. A kitchen utensil according to claim 3, wherein the lower guide plate is moulded from plastics material and wherein the blade member is secured therein during moulding whereby said strip is embedded in the plastics material and the plurality of cutting blades project from a surface of said lower guide plate.

5. A kitchen utensil according to claim 4, wherein there are two blade members secured in the plastics so that they converge in the direction of cutting.

6. A kitchen utensil according to claim 3, wherein the upper guide plate has a horizontal blade which is convergent in the direction of cutting.

7. A kitchen utensil according to claim 3, wherein the lower guide plate is reversible.

* * * * *